UNITED STATES PATENT OFFICE.

GRAY STAUNTON, OF EVANSTON, ILLINOIS, ASSIGNOR TO WILLIAM S. POTWIN, OF CHICAGO, ILLINOIS.

COMPOUND FOR PRINTERS' INKING-ROLLS AND THE LIKE.

1,000,634.     Specification of Letters Patent.     Patented Aug. 15, 1911.

No Drawing.     Application filed December 6, 1909. Serial No. 531,618.

*To all whom it may concern:*

Be it known that I, GRAY STAUNTON, a citizen of the United States, residing at Evanston, in the county of Cook and State of Illinois, have invented certain new and useful Improvements in Compounds for Printers' Inking-Rolls and the Like, of which the following is a specification.

My invention consists in a compound for printers' inking rolls and the like, and it has among its salient objects to provide a cheap composition exhibiting many of the characteristics of rubber, combined with qualities not existing in rubber, and peculiarly fitting the substance for employment in inking rolls.

The commercial requirements of printers' inking rolls begin with the essential demand that the roll have good "suction,"— that is to say, the uniform affinity for ink and clinging character of surface that qualifies it for even and ready reception, distribution, and delivery of the ink in the performance of its basic functions in the press.

The printers' inking rolls, now commercially in use, are of a gelatinous nature, subserving this primary requirement but entailing many disadvantages by reason of their composition and physical attributes. They are comparatively expensive; are short lived in use; have so little resiliency and tensile strength that they are easily damaged in handling, and are cut and destroyed by "rules" in the form; and are very sensitive to temperature changes. On this last score, it is a common knowledge that rolls of different composition have to be used in summer and winter and that a sudden change of temperature, such as is apt to occur in fall or spring of some climates, will so seriously affect the rolls in use that complete replenishment is necessary to permit of the effective working of the presses, with attendant expense, delay, and annoyance. These disadvantages a substance with the durability, tenacity, resiliency, flexibility, and stability of rubber would overcome in a great degree, but ordinary rubber is not available for use in printing rolls, as it has not the primarily-requisite suction, cannot withstand the ink solvents used in cleaning, and has other inherent disadvantages which prevent its successful employment on any large scale, where ordinarily good work is demanded.

My invention provides a compound, exhibiting the proper quality of suction and resistance to ink solvents, togther with the advantages of rubber-like resiliency, durability, and relative insensibility to temperature changes, and with the capability for cheap and easy manufacture.

My improved composition involves a base of artificial compound which I term "katchook," a filler of pre-vulcanized soft rubber of fairly good grade, and a vulcanizing agent, the whole vulcanized into a suitable consistency. The base compound I will now describe, but I do not claim *per se* in this application. It consists of a crude gum of the copal group (as pontianak, otherwise termed "gutta gelatong") a non-drying vegetable oil (as cotton-seed oil, or rape-seed oil), and a vulcanizing agent (as sulfur), with preferably a small quantity of lime added thereto. A good formula is 9 parts pontianak, and 4 parts cotton-seed oil, combined under from 350° F. to 400° F. heat in an open vessel with 2 parts of slaked lime and 2 parts of sulfur mixed and added to the mass and the whole vulcanized to about the consistency of the crude rubber of commerce.

In compounding a printers' inking roll, I mix on a rubber mill, in suitable proportion, "katchook" and rubber stock, the latter mainly, or wholly, in a pre-vulcanized form and of a relatively soft grade. Specifically, I preferably employ 6 parts "katchook" to 7 parts rubber scrap, such as buffings from tire-tubes, and one part of crude rubber. When these ingredients are intimately mixed, I add a part of sulfur, a little lime or litharge, and a little wool grease, and complete the mixing in the mill. The resultant mass is a somewhat sticky, putty-like body, which I flatten out in sheet form, and roll up on the roll-spindle or shaft, or otherwise form it into the desired shape, and insert it in a suitable mold.

While in the mold the compound is heated for, say, an hour at about 250° F., or otherwise treated, to vulcanize it to about the desired stiffness, say about that of ordinary printers'-roll compound.

It will, of course, be understood by those skilled in the art that variations might be made in the ingredients and proportions, and in the treatment, to vary the precise character and stiffness of the final product without departure from the spirit of the invention, and it will further be understood that the details above recited are herein embodied for purposes of full disclosure of one operative practice of my invention and not with limitational intent. The "katchook" compound is in a general way susceptible of treatment very much as would be crude rubber, and the skill of the rubber art will suggest such equivalent changes as the appropriate use of hyposulfate of lead in lieu of sulfur, litharge instead of lime, etc. Further, while I do not limit myself to the theories hereinafter expressed, for the purpose of full disclosure I state my belief that the base compound of copal gum and vegetable oil, vulcanized, gives to the ultimate composition a peculiarly effective suction, and other desirable qualities; that the vulcanized soft rubber stock, being not amenable to further vulcanization, acts both as a filler and as a means of tempering the hardness of the whole mass; that lime is advantageous in the composition both as an oxidizing agent and as a drier; and that wool grease aids mechanically in the preparation of the uncured stock and tends to resist effect of printers' ink solvent.

After curing under heat, as described, the roll is simply removed from its mold, and if mechanically true and perfect it is ready for use, as soon as cool. It has the general appearance of rubber, but a typically adhesive feel, or "grip," kindred to that of the common printers'-roll composition. It will be obvious that the composition is available for many uses, and that slight changes in the compounding and treatment will vary its hardness.

Having thus described my invention, what I claim is:

1. As an article of manufacture, a printers' inking roll, characterized by good suction and rubber-like resiliency and durability; compounded of a vulcanized base composition of gum of the copal group, and vegetable oil; admixed with pre-vulcanized rubber and wool grease; and thereafter vulcanized.

2. A composition of matter comprising a base compound formed of pontianak and vegetable oil united under heat and vulcanized; pre-vulcanized rubber; wool grease and a vulcanizing agent; vulcanized.

3. A composition of matter comprising a base compound formed of pontianak, a vegetable oil, an oxidizing agent, and a vulcanizing agent, united under heat and vulcanized; vulcanized rubber; wool grease and a vulcanizing agent; vulcanized.

4. A composition of matter comprising a base compound formed of pontianak and vegetable oil united under heat and vulcanized; pre-vulcanized rubber; a vulcanizing agent; wool grease and an oxidizing agent; mechanically admixed and vulcanized.

5. As an article of manufacture, a printers' roll composed of a vulcanized base composition of pontianak, vegetable oil, and lime, admixed with pre-vulcanized rubber, wool grease, sulfur, and lime, and thereafter vulcanized.

In testimony whereof I hereunto set my hand in the presence of two witnesses.

GRAY STAUNTON.

In the presence of—
W. LINN ALLEN,
MARY F. ALLEN.

---

Copies of this patent may be obtained for five cents each, by addressing the "Commissioner of Patents, Washington, D. C."